(12) United States Patent
Giddens

(10) Patent No.: US 10,576,599 B2
(45) Date of Patent: Mar. 3, 2020

(54) PORTABLE EPS PANEL RASPING PLATFORM

(71) Applicant: Baker Drywall IP Ltd., Mesquite, TX (US)

(72) Inventor: Edward Keith Giddens, McKinney, TX (US)

(73) Assignee: Baker Drywall IP Ltd., Mesquite, TX (US)

( * ) Notice: Subject to any disclaimer, the term of this patent is extended or adjusted under 35 U.S.C. 154(b) by 36 days.

(21) Appl. No.: 15/702,437

(22) Filed: Sep. 12, 2017

(65) Prior Publication Data

US 2019/0076978 A1 Mar. 14, 2019

(51) Int. Cl.

| B24B 7/18 | (2006.01) |
| B24B 7/08 | (2006.01) |
| B24B 7/22 | (2006.01) |
| B24B 7/00 | (2006.01) |
| B24B 7/30 | (2006.01) |

(Continued)

(52) U.S. Cl.
CPC .............. *B24B 7/182* (2013.01); *B23D 67/06* (2013.01); *B24B 7/005* (2013.01); *B24B 7/08* (2013.01); *B24B 7/22* (2013.01); *B24B 7/30* (2013.01); *B24B 27/0007* (2013.01); *E04B 1/80* (2013.01)

(58) Field of Classification Search
CPC .. B24B 7/182; B24B 7/08; E04B 1/80; B27C 1/00; B27C 1/005; B27C 1/007; B27C 1/02; B27C 1/04; B27C 1/06; B27C 1/08; B27L 5/004; B27L 5/006; B27L 5/008; B27L 5/02; B27L 5/022; B27L 5/025; B27L 5/027; B27L 5/04; B27L 5/06

USPC .... 144/114.1–130.2, 162.1–181.3, 182–191; 451/231

See application file for complete search history.

(56) References Cited

U.S. PATENT DOCUMENTS

| 1,744,808 A | 1/1930 | Schulte |
| 2,326,264 A | 8/1943 | Stetler |

(Continued)

FOREIGN PATENT DOCUMENTS

| CN | 205600445 U | 9/2016 | |
| DE | 19723306 A1 * | 12/1998 | ............... B24B 7/22 |
| FR | 1034954 A | 8/1953 | |

OTHER PUBLICATIONS

International Search Report and Written Opinion received in Patent Cooperation Treaty Application No. PCT/2018/050733, dated Feb. 27, 2019.

*Primary Examiner* — George B Nguyen
(74) *Attorney, Agent, or Firm* — Wei Wei Jeang; Grable Martin Fulton PLLC

(57) ABSTRACT

A portable rasping platform for rasping a top surface of a wall panel includes a plurality of adjustable leveling supports, a pair of support rails, and a drum rasp assembly. The drum rasp assembly includes a drum rasp, a motor coupled to the drum rasp and configured to rotate the drum rasp at a suitable speed, and a truss frame supporting the drum rasp and configured to roll along the pair of support rails. The pair of support rails are configured to be positioned on the plurality of adjustable leveling supports arranged in parallel a certain space apart, and the plurality of adjustable leveling supports are configured to support the wall panel. The drum rasp is configured to pass over and treat the top surface of the wall panel as the drum rasp assembly is displaced along the pair of support rails.

18 Claims, 5 Drawing Sheets

(51) Int. Cl.
  *B24B 27/00* (2006.01)
  *B23D 67/06* (2006.01)
  *E04B 1/80* (2006.01)

(56) References Cited

U.S. PATENT DOCUMENTS

| | | | | |
|---|---|---|---|---|
| 2,332,625 | A * | 10/1943 | Ellis | B64F 5/10 269/116 |
| 2,483,369 | A * | 9/1949 | Loucony | B24B 7/08 451/178 |
| 4,204,448 | A * | 5/1980 | Pearl | B26D 7/20 83/170 |
| 4,817,693 | A * | 4/1989 | Schuler | B23D 47/025 144/117.1 |
| 5,027,558 | A * | 7/1991 | Boquet | B24B 31/0224 134/119 |
| 5,056,272 | A * | 10/1991 | Battaglia | B24B 7/06 125/13.01 |
| 5,157,875 | A * | 10/1992 | Hill | B24B 13/005 279/50 |
| 5,255,724 | A * | 10/1993 | Butke | B23Q 1/74 108/33 |
| 5,519,908 | A * | 5/1996 | Steinman | B24D 15/084 30/161 |
| 7,628,186 | B2 * | 12/2009 | Blum | B25H 1/08 108/115 |
| 7,658,187 | B2 * | 2/2010 | Budiac | B28D 1/044 125/13.01 |
| 7,748,373 | B2 * | 7/2010 | Toncelli | B28D 1/043 125/35 |
| 7,926,523 | B2 * | 4/2011 | Williams | B25H 1/10 144/286.5 |
| 8,327,893 | B2 * | 12/2012 | Jesberger | B23D 47/025 144/286.1 |
| 2003/0119435 | A1 * | 6/2003 | Ohlendorf | B24B 23/02 451/454 |
| 2003/0230700 | A1 * | 12/2003 | Kemeny | F16M 7/00 248/677 |
| 2007/0107806 | A1 * | 5/2007 | Jesberger | B23D 47/025 144/286.5 |
| 2008/0248725 | A1 | 10/2008 | Craycraft | |
| 2010/0151774 | A1 * | 6/2010 | Bower | B24B 23/02 451/344 |
| 2014/0342125 | A1 * | 11/2014 | Rees | B24B 7/10 428/151 |
| 2014/0378034 | A1 * | 12/2014 | Clabunde | B24B 23/04 451/356 |

* cited by examiner

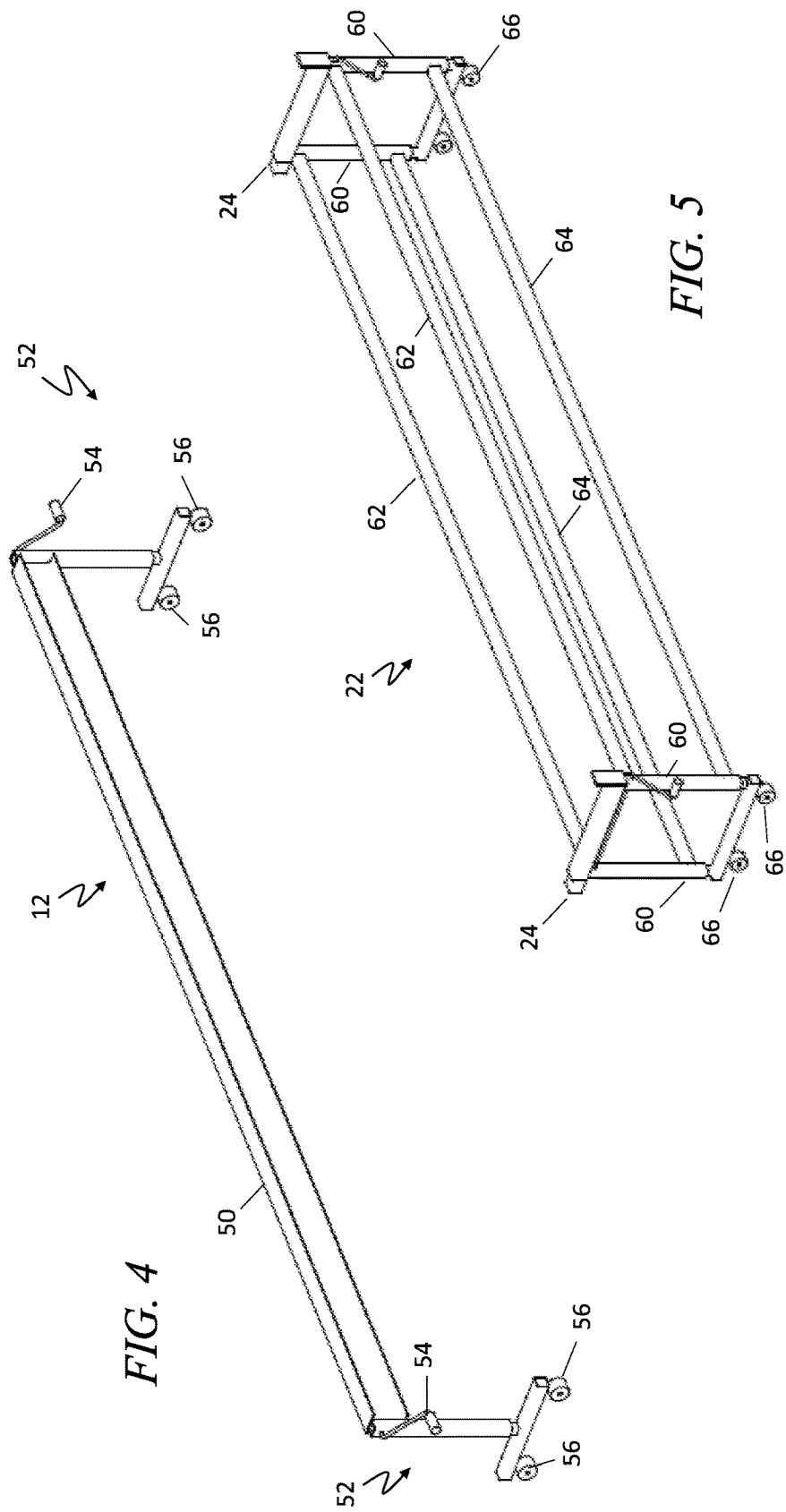

10,576,599 B2

PORTABLE EPS PANEL RASPING PLATFORM

FIELD

The present disclosure relates to manufacturing processes and fixtures, and particularly to a portable Expanded Polystyrene (EPS) panel rasping platform.

BACKGROUND

Since 2012 the International Energy Conservation Code (IECC) has required continuous insulation (CI) in the building envelope in most climate zones (as defined by ASHRAE 90.1). To help improve the energy efficiency of buildings, the 2012 IECC has specifically prescribed how much insulation is required for various types of above grade walls, and below grade slab, walls, roofs, and floors, within each of the eight U.S. climate zones for both commercial and residential buildings. Among rigid foam insulations, EPS or Expanded Polystyrene has the highest R-value per dollar, which makes it well-suited for cost-effective continuous insulation. EPS is a rigid closed-cell foam that provides about R 4.6 per inch of thickness. Because of its durable, light-weight, and insulative properties, EPS is an ideal material for the fabrication of insulated construction panels for interior and exterior building surfaces and walls. EPS is the most versatile of rigid insulations because it can be used anywhere in the building envelope—roof, walls, floors, and below grade since it dries quickly and assists with moisture management requirements.

BRIEF DESCRIPTION OF THE DRAWINGS

FIG. 4 is a perspective view of an exemplary embodiment of adjustable leveling support jacks for the portable EPS panel rasping platform according to the teachings of the present disclosure;

FIG. 5 is a perspective view of an exemplary embodiment of a drum rasp dolly for the portable EPS panel rasping platform according to the teachings of the present disclosure.

DETAILED DESCRIPTION

Expanded Polystyrene (EPS) interior and exterior wall panels are fabricated by laminating or adhering EPS sheets to a wall panel assembly that may incorporates other materials and a metal stud frame. Due to unevenness and irregularities in the surface of fabricated EPS sheets, the EPS surface of the assembled wall panels must be rasped or sanded to achieve a consistently even and flat planar surface. This task traditionally relied on the skills, experience, and attention to detail of craftspeople using hand rasping tools. However, the result can often be unsatisfactory with inconsistent and uneven surfaces and varying thicknesses. The portable EPS panel rasping platform concept described herein not only produces a uniform and even surface but is also easy to deploy and move around the manufacturing floor wherever the wall panels are fabricated. The portability of the EPS panel rasping platform also makes it easy to transport and deploy on a job site.

Figure 1:
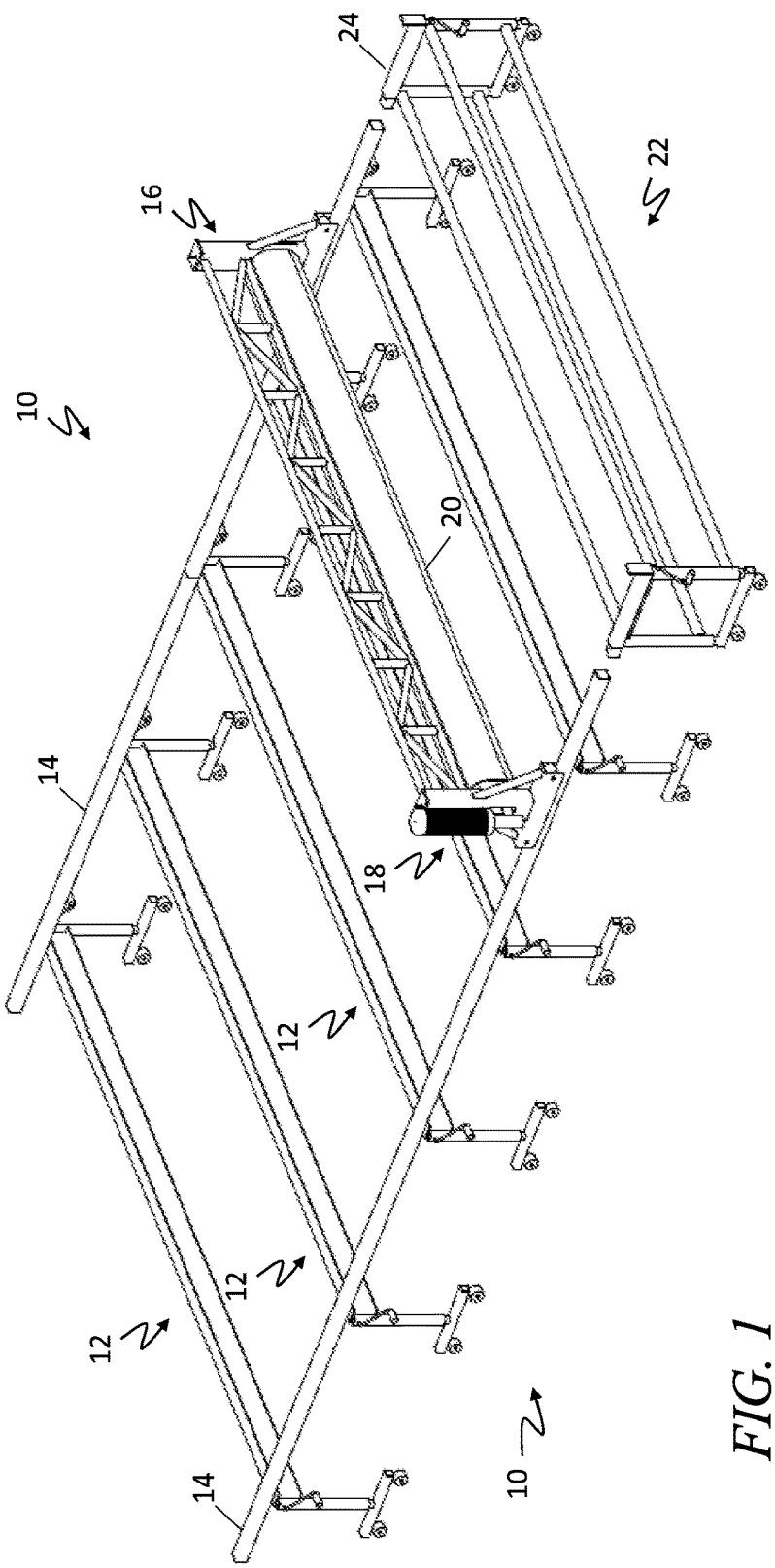
FIG. 1 is a perspective view of an exemplary embodiment of a portable EPS panel rasping platform according to the teachings of the present disclosure.

FIG. 1 is a perspective view of an exemplary embodiment of a portable EPS panel rasping platform 10 according to the teachings of the present disclosure. The portable EPS panel rasping platform 10 is not affixed to the manufacturing floor, but is designed to be easily disassembled and reassembled so that it can be quickly moved to any location on the manufacturing floor where a wall or wall panel assembly requiring rasping in the manufacturing process is located. When disassembled, the components of the platform can be compactly stored. Because of its portability and ease of assembly, the portable EPS panel rasping platform 10 can also be easily transported and deployed at a job site.

The portable EPS panel rasping platform 10 includes a plurality of adjustable leveling supports 12 supporting a pair of parallel drum rasp support rails 14 on which a drum rasp assembly 16 rides. The plurality of adjustable leveling supports 12 are arranged in parallel at a predetermined distance apart best suited for the size of the wall panel to be processed. The drum rasp assembly 16 includes a motor 18 that drives the rotational spin of a drum rasp 20 that spans the length of the drum rasp assembly 16. The motor 18 may be a variable-speed motor so that the rotational speed of the drum rasp 20 can be user-selectable. The drum rasp support assembly 16 can be moved on its own dolly 22 that has top rails 24 that are designed to meet and join with the support rails 14 positioned on the adjustable leveling supports 12. Once support rails 24 of the dolly 22 couples to rails 14 supported by the adjustable leveling supports 12, the drum rasp support assembly 16 can glide or roll from the dolly 22 to the rails 14 and over the top surface of a EPS wall panel placed on the adjustable leveling supports 12. The height of the drum rasp 20 can be adjusted to change how much of the EPS surface would be removed.

In operation, the drum rasp support assembly 16 travels down the length of support rails 14 while the drum rasp 20 rotates to sand or plane the surface of the EPS wall panel. The drum rasp support assembly 16 can be manually moved down the length of the EPS panel or alternatively a motor may be used to drive its linear movement. It may be seen that the number of adjustable leveling supports 12 used to support the EPS panel can be increased and decreased depending on the length of the panel, and the distance between the adjustable leveling supports 12 can also be adjusted to ensure that the drum rasp support assembly 16 is properly supported while it travels down the length of the wall panel and creates a smooth level surface.

Figure 2:
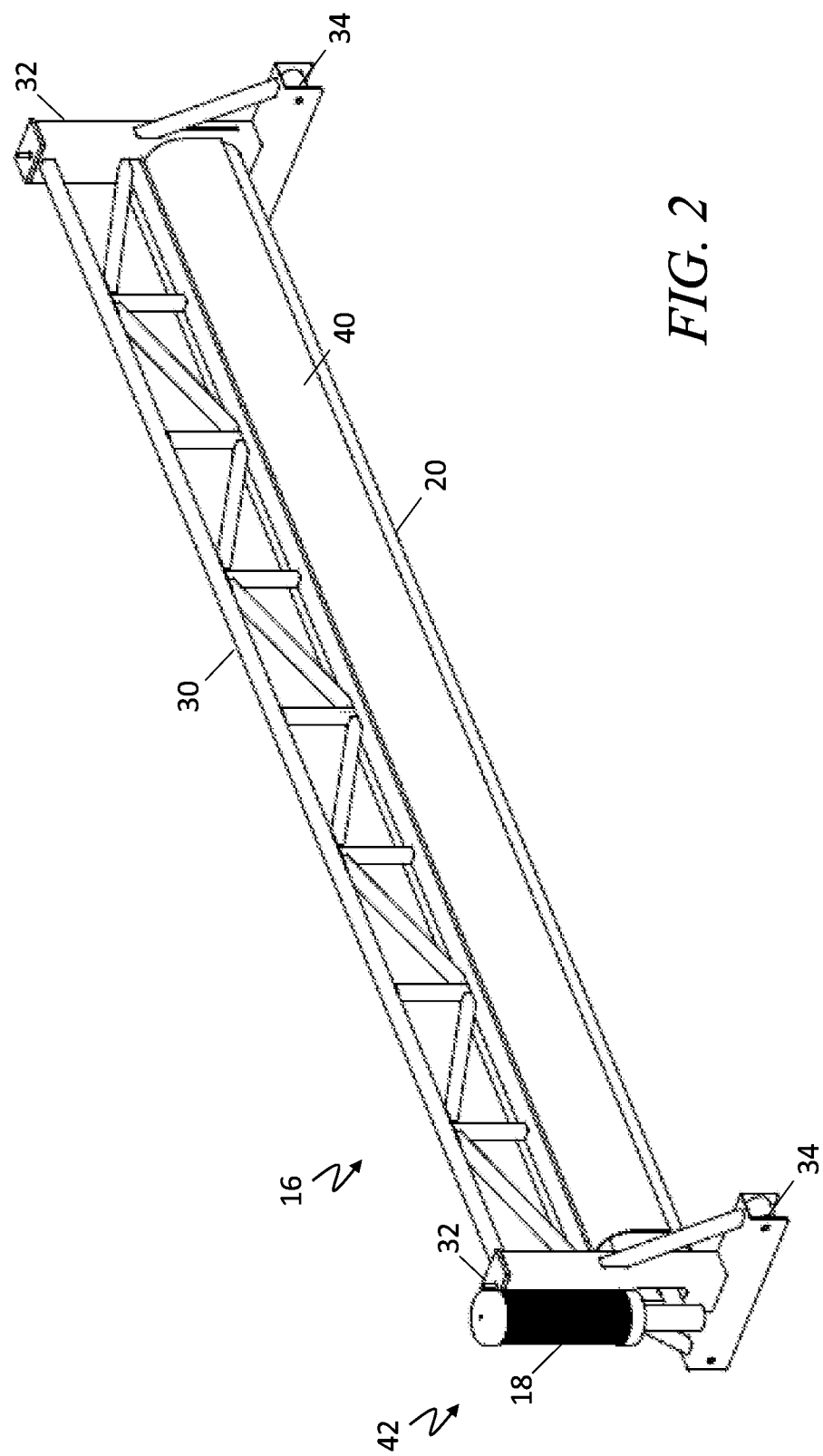
FIG. 2 is a perspective view of an exemplary embodiment of a drum rasp support and assembly for the portable EPS panel rasping platform according to the teachings of the present disclosure.
Figure 3:
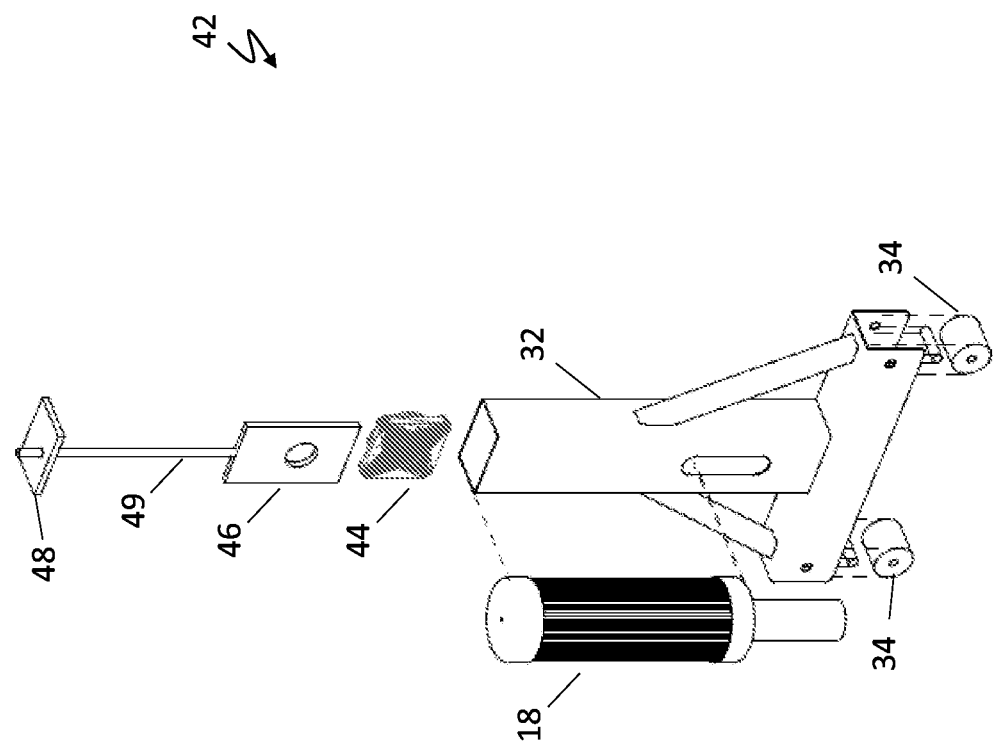
FIG. 3 is an exploded view of an exemplary embodiment of a drum rasp end assembly for the portable EPS panel rasping platform according to the teachings of the present disclosure.

FIG. 2 is a perspective view of an exemplary embodiment of drum rasp support assembly 16 for the portable EPS panel rasping platform 10 according to the teachings of the present disclosure. The drum rasp support assembly 16 includes a rotating drum rasp 20 disposed below a truss frame 30. The truss frame 30 is attached to and held up by two vertical posts 32 that are mounted to wheels 34 that ride on the support rails 14. The truss frame 30 provides the structural integrity to support the weight of the drum rasp 20 and an extraction hood 40 that facilitates coupling of a vacuum device (not shown) to collect and remove loose polystyrene materials. At one end, a drum rasp end assembly 42 includes the motor 18 that drives the drum rasp 20 is mounted on the vertical support 32. Referring also to FIG. 3 for an exploded view of an exemplary embodiment of the drum rasp end assembly 42, a bearing 44 coupled to the drum rasp 20 is mounted to a plate 46 and disposed within the vertical support 32. The position of the entire drum assembly, 20, plate 46 and the bearing 44 can be raised or lowered by turning a threaded rod 49 which is accessible at the top plate 48. The top plate 48 is dimensioned so that it rests on top of the vertical support post 32. By turning the threaded rod 49 clockwise, the drum assembly lowers. By turning the treaded rod 49 counter-clockwise, the drum assembly raises. The same plate 46 and bearing assembly 44 is also housed within the vertical support post 32 at the other end of the drum rasp assembly 16.

FIG. 4 is a perspective view of an exemplary embodiment of adjustable leveling supports 12 for the portable EPS panel rasping platform 10 according to the teachings of the present disclosure. Each adjustable leveling support 12 includes a horizontal beam 50 coupled and spanning between a pair of heavy duty jacks 52. The height of the jacks 52 can be adjusted by using hand cranks 54. The adjustable leveling supports 12 also include swivel casters 56 to increase their mobility so that they can be easily moved and positioned.

FIG. 5 is a perspective view of an exemplary embodiment of a drum rasp dolly 22 for the portable EPS panel rasping platform 10 according to the teachings of the present disclosure. The drum rasp dolly 22 includes rails 24 with a square cross-section that are dimensioned and configured to couple with the drum rasp support rails 14 on the adjustable leveling supports 12. The rails 24 are supported by a pair of linked jacks 60 on each side so that they can be used to vary the height of the rails 24 when the handles are cranked. The dolly 22 may further include upper horizontal structural members 62 and lower horizontal structural members 64 that are the same length as the adjustable leveling supports 12. The drum rasp dolly 22 also includes swivel casters 66 to enable easy movement and positioning.

Figure 6:
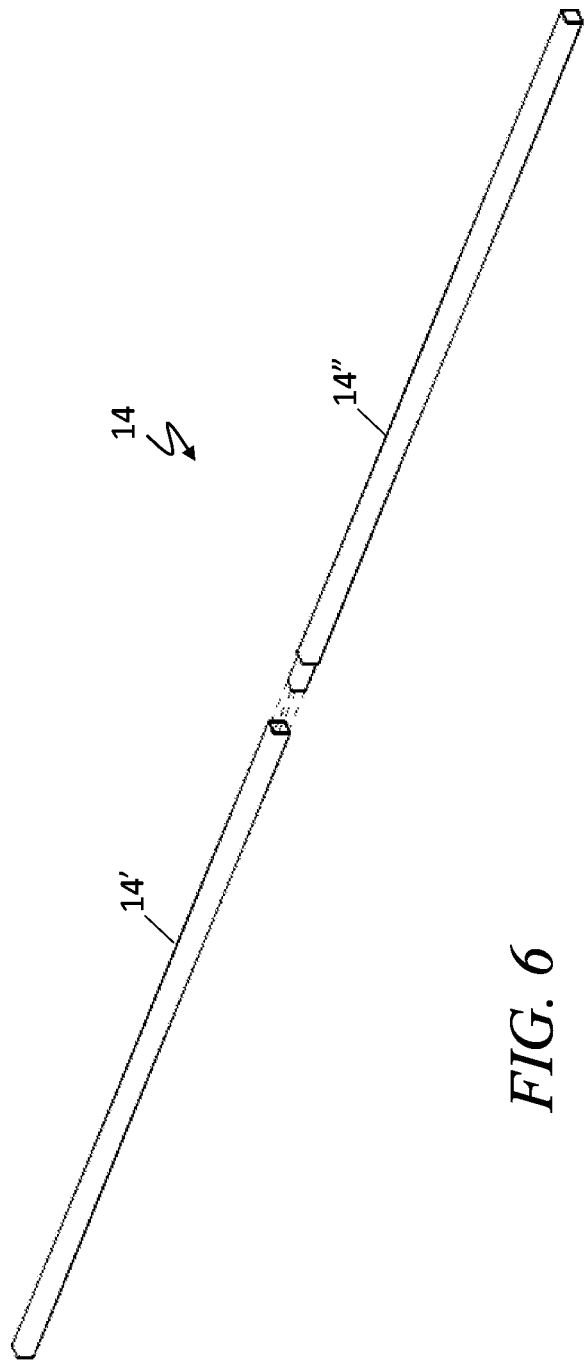
FIG. 6 is a perspective view of an exemplary embodiment of a drum rasp support rail for the portable EPS panel rasping platform according to the teachings of the present disclosure.

FIG. 6 is a perspective view of an exemplary embodiment of a drum rasp support rail 14 for the portable EPS panel rasping platform 10 according to the teachings of the present disclosure. The drum rasp support rail 14 preferably includes multiple segments of hollow tubing 14' and 14" approximately 20 feet in length and having a square cross-section with mated ends that enable the segments to be joined together to form a single contiguous support rail 14. As shown in FIG. 1, the drum rasp support rails 14, when properly positioned on adjustable leveling supports 12, are configured to join the rails 24 of the drum rasp dolly 22 to form a continuous path so that the drum rasp support assembly 16 can easily glide or roll from the dolly 22 onto the support rails 14 that are positioned on the adjustable leveling supports 12.

In operation, EPS wall panels are fabricated by laminating layers of materials including an EPS sheet and may incorporate metal stud framing. These wall panels are typically heavy, bulky, and difficult to manipulate. The portable EPS panel rasping platform 10 can be easily disassembled, moved, and reassembled beneath a wall panel on the manufacturing floor. The adjustable leveling supports 12 can be moved and placed in a parallel configuration beneath the panel a certain distance apart along one dimension. Two drum rasp support rails 14 are then placed on the adjustable leveling supports 12 perpendicular to them. Stops or guides can be formed or marked on the adjustable leveling supports 12 to make it easier to properly align the support rails 14 on the adjustable leveling supports 12. The height of the adjustable leveling supports 12 can be adjusted so that they form a level platform to fully support the weight of the panel. The drum rasp assembly 16 situated on the dolly 22 can then be brought to one end of the platform. The rails 24 of the dolly 22 are then connected to the ends of support rails 14 so that a continuous path is formed to allow the drum rasp support assembly 16 to roll onto the rails 14 and over the wall panel. Prior to rolling onto the platform, the drum rasp 20 is turned on so that the rotating drum rasp 20 passes over the panel as the drum rasp support assembly 16 is pushed or pulled along entire length of the panel to even out its top surface. In this manner, the time required to even out the surface of the wall panel is significantly shortened. Additionally, this task no longer requires experienced and skilled labor to achieve a flawless even surface. After the completion of the process, the entire platform is disassembled and moved to the location of the next wall panel on the manufacturing floor. Because of the compactness of its component parts and the ease of transport, the platform can be easily deployed at a job site.

It may be seen that the number of and/or the dimensions of the adjustable leveling supports 12 and support rails 14 can be varied to accommodate wall panels of different sizes. The support rails 14 can be extended or shortened by using fewer or more segments. Further, the height of the drum rasp can be adjusted to accommodate wall panels of different thicknesses.

The features of the present invention which are believed to be novel are set forth below with particularity in the appended claims. However, modifications, variations, and changes to the exemplary embodiments described above will be apparent to those skilled in the art, and the portable EPS wall panel rasping platform described herein thus encompasses such modifications, variations, and changes and are not limited to the specific embodiments described herein.

What is claimed is:

1. A portable rasping platform for rasping a top surface of a wall panel comprising:
   a plurality of adjustable leveling supports;
   a pair of support rails;
   a drum rasp assembly comprising:
      a drum rasp;
      a motor coupled to the drum rasp and configured to rotate the drum rasp at a suitable speed; and
      a truss frame supporting the drum rasp and configured to roll along the pair of support rails;
   wherein the pair of support rails are configured to be positioned on the plurality of adjustable leveling supports arranged in parallel a certain space apart, and the plurality of adjustable leveling supports are configured to support the wall panel, and the drum rasp is configured to pass over and treat the top surface of the wall panel as the drum rasp assembly is displaced along the pair of support rails; and
   a drum rasp dolly configured to transport the drum rasp assembly to the rasping platform comprising:
      a pair of top rails configured to join ends of the pair of support rails to form a continuous path for the drum rasp assembly to travel from the dolly to the pair of support rails of the rasping platform;
      adjustable-height vertical supports coupled the pair of top rails; and
      swivel coasters coupled to the adjustable-height vertical supports.

2. The portable rasping platform of claim 1, wherein the plurality of adjustable leveling supports each comprises at least one jack.

3. The portable rasping platform of claim 1, wherein the plurality of adjustable leveling supports each comprises swivel coasters.

4. The portable rasping platform of claim 1, wherein the drum rasp assembly further comprises rollers for rolling along the support rails.

5. The portable rasping platform of claim 1, wherein the pair of support rails each comprises a plurality of segments.

6. The portable rasping platform of claim 1, wherein the drum rasp assembly further comprises an extraction hood disposed over the drum rasp.

7. The portable rasping platform of claim 1, wherein the drum rasp assembly further comprises a mechanism to vary the height of the drum rasp.

8. A rasping platform for rasping a top surface of a wall panel having first and second portions, wherein the first portion comprising:
    a plurality of adjustable leveling supports arranged in parallel a predetermined distance apart and forming a platform having a longitudinal axis, the plurality of adjustable leveling supports being configured to support the wall panel;
    a pair of support rails arranged spaced apart on the plurality of adjustable leveling supports parallel to the longitudinal axis of the platform;
    a drum rasp assembly comprising:
        a drum rasp;
        a motor coupled to the drum rasp and configured to rotate the drum rasp at a suitable speed;
        a truss frame supporting the drum rasp and configured to roll along the pair of support rails; and
        wherein the drum rasp is configured to pass over and treat the top surface of the wall panel as the drum rasp assembly is displaced along the pair of support rails; and
    a second portion of the rasping platform forming a dolly comprising:
        a pair of top rails configured to join ends of the pair of support rails of the first portion to form a continuous path for the drum rasp assembly to travel from the dolly to the pair of support rails of the rasping platform;
        adjustable-height vertical supports coupled the pair of top rails; and
        swivel coasters coupled to the adjustable-height vertical supports; and
    wherein the plurality of adjustable leveling supports, the pair of support rails, and the drum rasp assembly may be easily disassembled, transported, and reassembled.

9. The rasping platform of claim 8, wherein the plurality of adjustable leveling supports each comprises at least one jack.

10. The rasping platform of claim 8, wherein the plurality of adjustable leveling supports each comprises swivel coasters.

11. The rasping platform of claim 8, wherein the drum rasp assembly further comprises rollers for rolling along the support rails.

12. The rasping platform of claim 8, wherein the pair of support rails each comprises a plurality of segments.

13. The rasping platform of claim 8, wherein the drum rasp assembly further comprises an extraction hood disposed over the drum rasp.

14. The rasping platform of claim 8, wherein the drum rasp assembly further comprises a mechanism to vary the height of the drum rasp.

15. A rasping platform for rasping a top surface of an EPS wall panel comprising:
    a plurality of adjustable leveling supports arranged to form a platform having a longitudinal axis, the plurality of adjustable leveling supports being configured to support the EPS wall panel;
    a pair of support rails placed in parallel and spaced apart on the plurality of adjustable leveling supports in alignment with the longitudinal axis of the platform;
    a drum rasp assembly comprising:
        a drum rasp;
        a motor coupled to the drum rasp and configured to rotate the drum rasp at a suitable speed;
        a pair of vertical support members configured to roll along the pair of support rails;
        a horizontal member spanning between the pair of vertical support members and suspending the drum rasp over the adjustable leveling supports; and
        wherein the drum rasp is configured to pass over and treat the top surface of the EPS wall panel as the drum rasp assembly is displaced along the pair of support rails; and
        wherein the plurality of adjustable leveling supports, the pair of support rails, and the drum rasp assembly may be easily disassembled, transported, and reassembled; and
    a drum rasp dolly configured to transport the drum rasp assembly to the rasping platform comprising:
        a pair of top rails configured to join ends of the pair of support rails to form a continuous path for the drum rasp assembly;
        adjustable-height vertical supports coupled the pair of top rails;
        swivel coasters coupled to the adjustable-height vertical supports; and
        wherein the drum rasp assembly is configured to ride on the pair of top rails.

16. The rasping platform of claim 15, further comprising a drum rasp dolly comprising:
    a pair of top rails configured to join ends of the pair of support rails to form a continuous path for the drum rasp assembly;
    adjustable-height vertical supports coupled the pair of top rails;
    swivel coasters coupled to the adjustable-height vertical supports; and
    wherein the drum rasp assembly is configured to ride on the pair of top rails.

17. The rasping platform of claim 15, wherein the plurality of adjustable leveling supports each comprises a pair of jacks.

18. The rasping platform of claim 15, wherein the drum rasp assembly further comprises a mechanism to vary the height of the drum rasp.

* * * * *